(12) United States Patent
Surendran et al.

(10) Patent No.: US 10,979,424 B2
(45) Date of Patent: Apr. 13, 2021

(54) SYSTEMS, METHODS, AND APPARATUSES FOR SECURE BIOMETRIC IDENTIFIER AUTHENTICATION WITHIN A CLOUD BASED COMPUTING ENVIRONMENT

(71) Applicant: salesforce.com, inc., San Francisco, CA (US)

(72) Inventors: Amal Thannuvelil Surendran, Kerala (IN); Himanshu Mittal, Hyderabad (IN); Ajay Krishna Borra, Hyderabad (IN); Manpreet Singh, Hyderabad (IN)

(73) Assignee: salesforce.com, inc., San Francisco, CA (US)

( * ) Notice: Subject to any disclaimer, the term of this patent is extended or adjusted under 35 U.S.C. 154(b) by 218 days.

(21) Appl. No.: 16/148,959

(22) Filed: Oct. 1, 2018

(65) Prior Publication Data
US 2020/0106770 A1  Apr. 2, 2020

(51) Int. Cl.
*H04L 29/06* (2006.01)
*G06F 16/9535* (2019.01)

(52) U.S. Cl.
CPC ...... *H04L 63/0861* (2013.01); *G06F 16/9535* (2019.01)

(58) Field of Classification Search
CPC .............. H04L 63/0861; G06F 16/9535
USPC ............................................. 726/6
See application file for complete search history.

(56) References Cited

U.S. PATENT DOCUMENTS

| | | | |
|---|---|---|---|
| 2003/0177141 A1* | 9/2003 | Sahlin | G07C 11/00 |
| 2013/0182279 A1* | 7/2013 | Yano | H04N 1/00854 358/1.14 |
| 2014/0101434 A1* | 4/2014 | Senthurpandi | G06F 21/32 713/150 |
| 2015/0256530 A1* | 9/2015 | Semba | H04L 63/0815 726/5 |
| 2016/0226867 A1* | 8/2016 | Harding | H04L 63/0861 |

* cited by examiner

Primary Examiner — Michael S McNally
(74) Attorney, Agent, or Firm — Elliot, Ostrander & Preston, P.C.

(57) ABSTRACT

A cloud services application executing on a cloud computing platform receives from a browser application executing on a customer computer system a request of a user to login to the cloud services application. The cloud services application further receives an indication via the browser application that biometric identifier authentication of the user is supported by the customer computer system, and transmits an indication to the browser application that biometric identifier authentication of the user is enabled for a session that is to be established. The cloud services application transmits a response to the login request, responsive to receipt of the login request, the response prompting the user to input a biometric identifier, and receives a unique identifier (UID) associated with the biometric identifier. The cloud services application searches a list of user profiles, each with an associated one or more UIDs, for a UID that matches the received UID associated with the biometric identifier and transmits an indication to the browser application allowing access to the web service application responsive to finding a UID that matches the received UID associated with the biometric identifier.

23 Claims, 7 Drawing Sheets

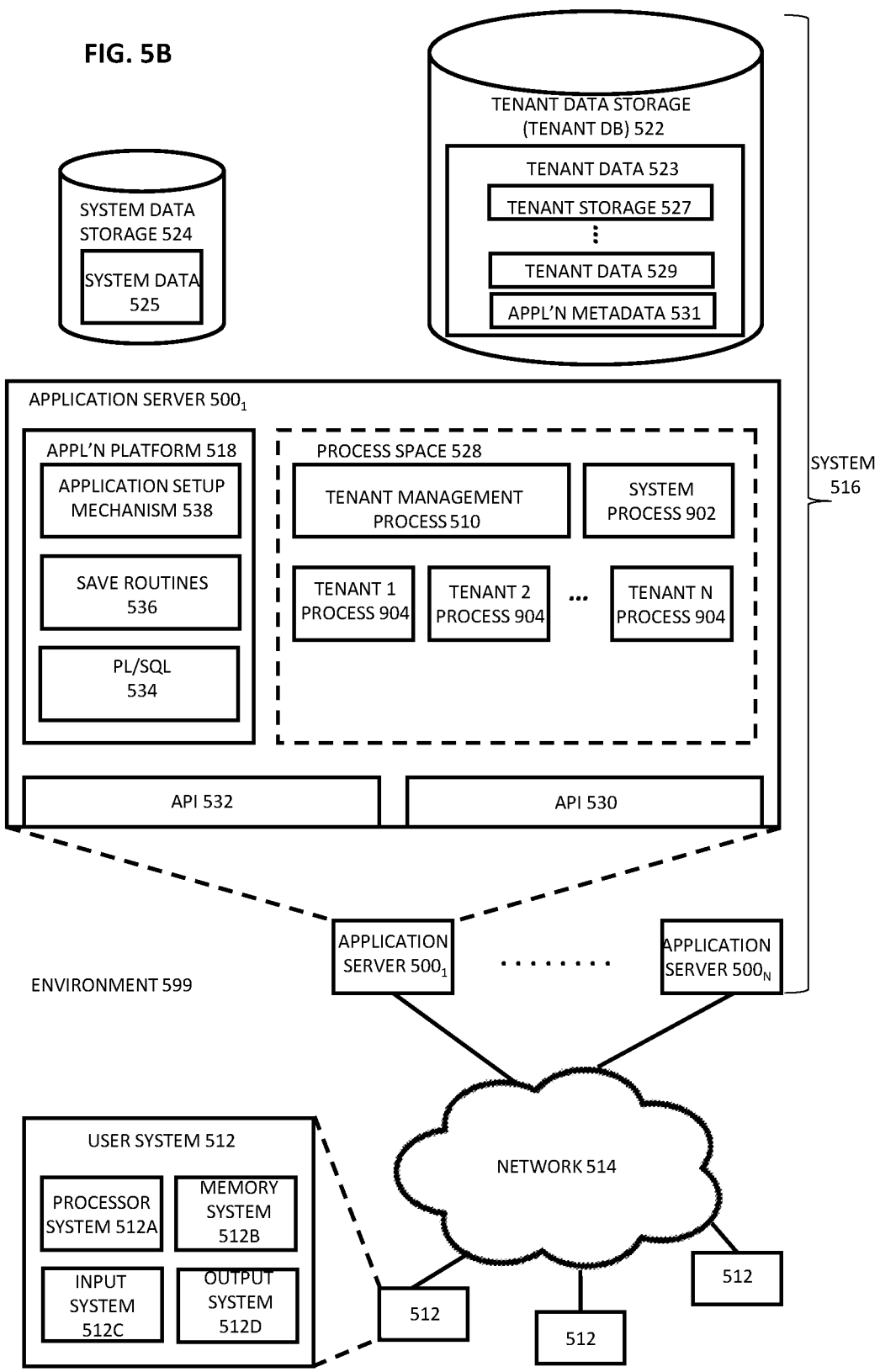

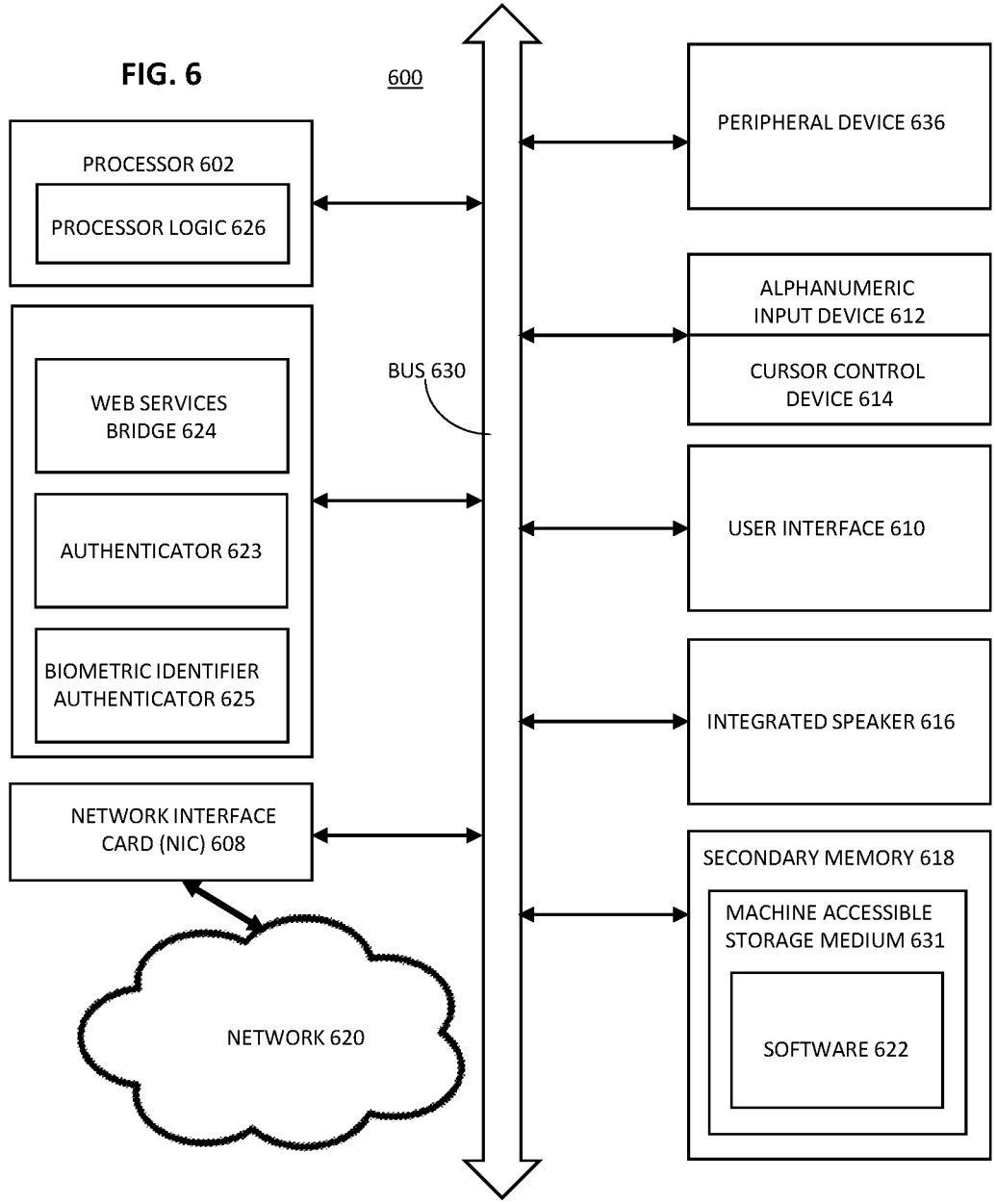

SYSTEMS, METHODS, AND APPARATUSES FOR SECURE BIOMETRIC IDENTIFIER AUTHENTICATION WITHIN A CLOUD BASED COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for implementing secure biometric identifier authentication within a cloud based computing environment such as a database system implementation supported by a processor and a memory to execute such functionality. Such means may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

Biometric identifier-based user authentication on a local device does not necessarily involve the transmission of biometric identifier information across a transmission medium such as the Internet. However, if the user is attempting to login to a cloud-based application services using biometric identifier-based information to authenticate the user, it is possible that the biometric identifier information may be intercepted, modified, or forged, when transmitted from a web-browser at which the user is providing the biometric identifier information across the Internet to the cloud-based application. What is needed is secure way to provide for biometric identifier-based user authentication, for example, when the user is logging on to a website, into a cloud community, into a cloud organization, attempting to make a an online purchase, or the like.

The present state of the art may therefore benefit from the systems, methods, and apparatuses for implementing secure biometric identifier authentication within a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 5B illustrates another block diagram of an embodiment of elements of FIG. 5A and various possible interconnections between such elements in accordance with the described embodiments; and FIG. 6 illustrates a diagrammatic representation of a machine in the exemplary form of a computer system, in accordance with one embodiment.

DETAILED DESCRIPTION

Figure 1:
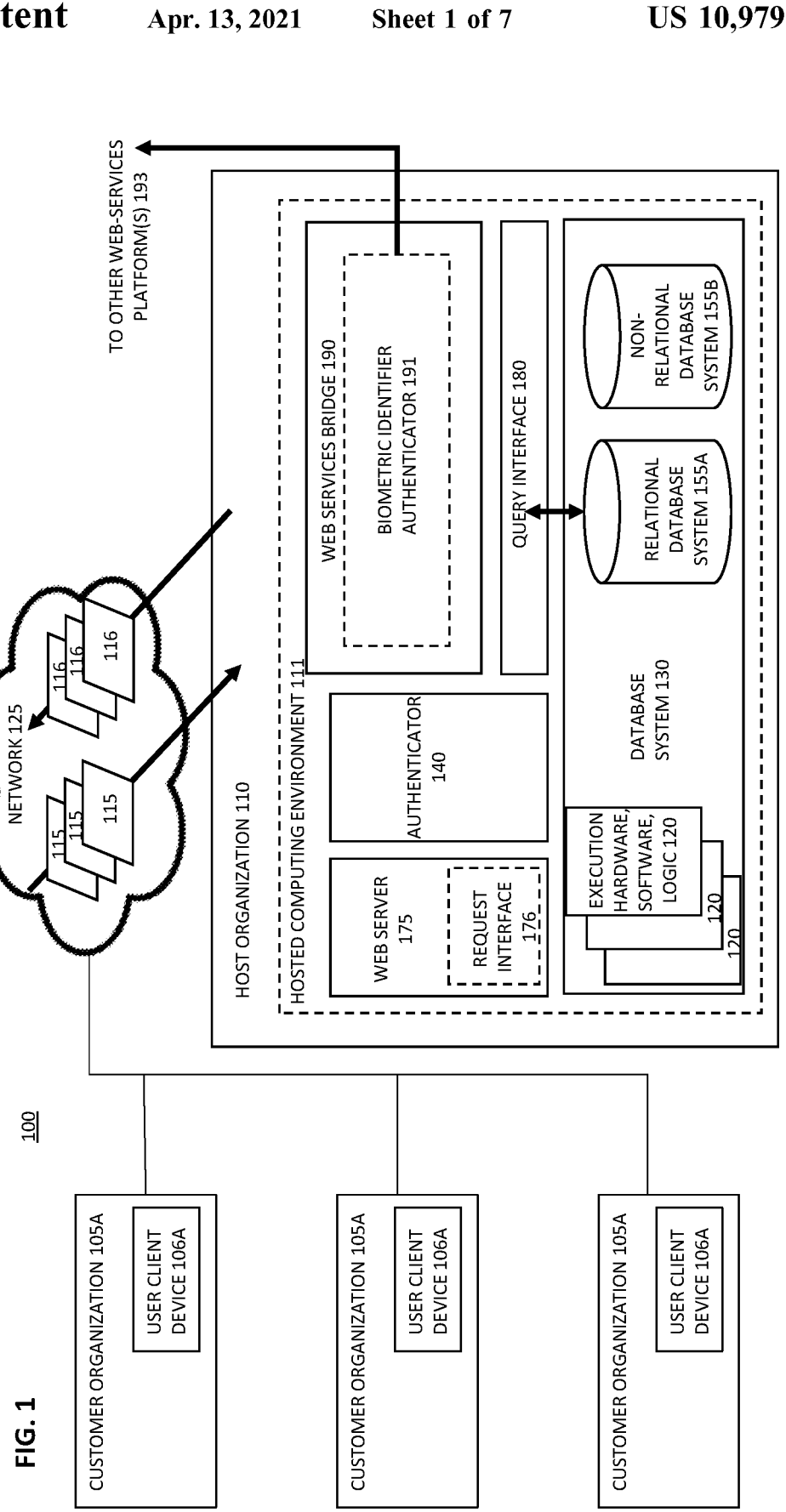
FIG. 1 depicts an exemplary architecture in accordance with described embodiments.

Described herein are systems, methods, and apparatuses for implementing secure biometric authentication within a cloud based computing environment. For instance, such an exemplary system having a processor and a memory therein includes a cloud services application executing on a cloud computing platform that receives from a browser application executing on a customer computer system a request of a user to login to the cloud services application. The cloud services application further receives an indication via the browser application that biometric identifier authentication of the user is supported by the customer computer system, and transmits an indication to the browser application that biometric identifier authentication of the user is enabled for a session that is to be established. The cloud services application transmits a response to the login request, responsive to receipt of the login request, the response prompting the user to input a biometric identifier, and receives a unique identifier (UID) associated with the biometric identifier. The cloud services application searches a list of user profiles, each with an associated one or more UIDs, for a UID that matches the received UID associated with the biometric identifier and transmits an indication to the browser application allowing access to the web service application responsive to finding a UID that matches the received UID associated with the biometric identifier.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

Certain embodiments may utilize a client-server computing architecture to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization or resources of the host organization.

Still further depicted within the hosted computing environment 111 is the web-services bridge 190 having therein both a biometric identifier authenticator 191 capable of communicating with other web-services platform(s) 193 which regardless of whether such web-services platforms are hosted by the same host organizations 110 or hosted by different host organizations.

Figure 2:
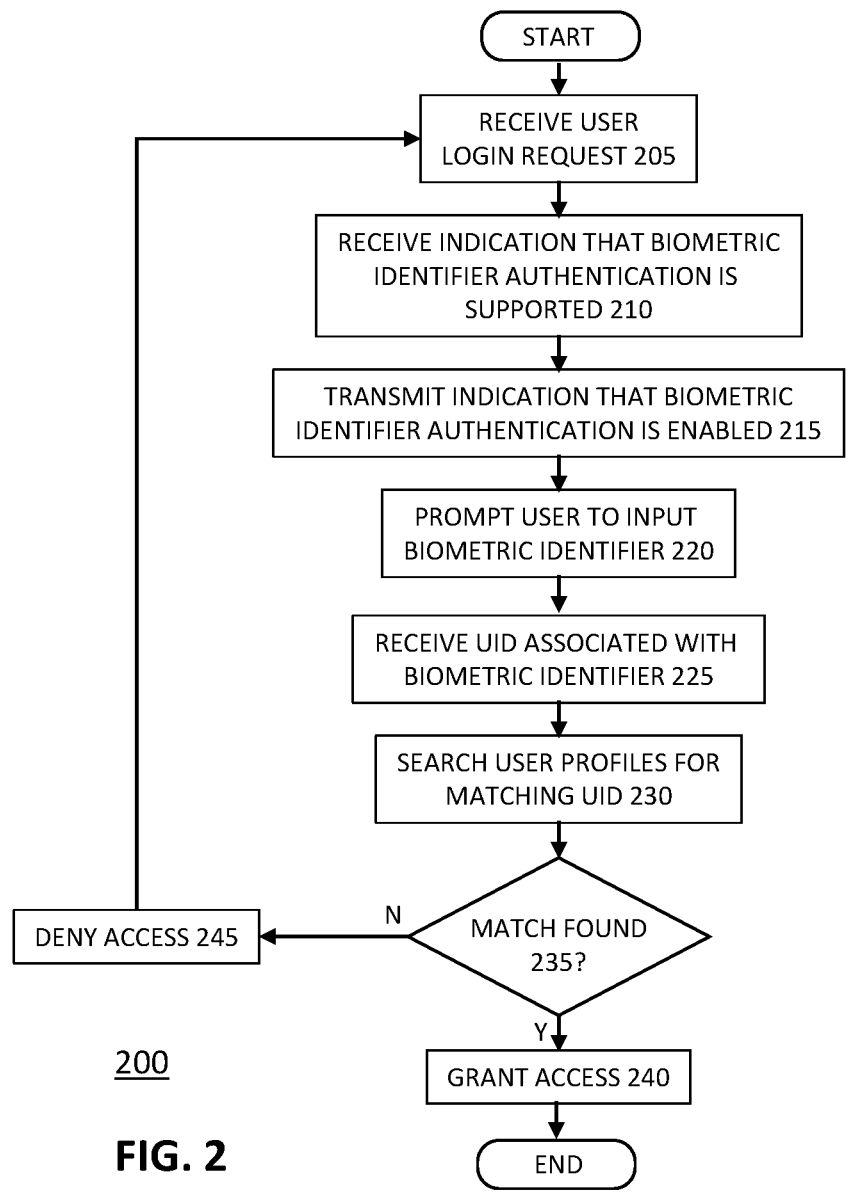
FIG. 2 depicts a flow diagram illustrating aspects of a method for implementing secure biometric authentication within a cloud based computing environment in accordance with disclosed embodiments.
Figure 3:
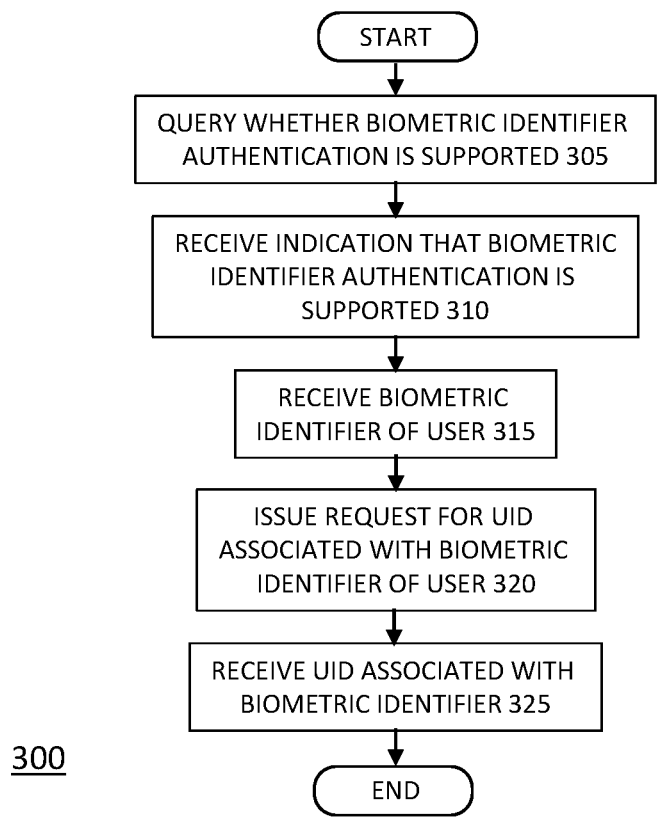
FIG. 3 depicts a flow diagram illustrating aspects of a method for implementing secure biometric authentication within a cloud based computing environment in accordance with disclosed embodiments.

FIGS. 2 and 3 depict flow diagrams illustrating a method 200/300 for implementing secure biometric identifier authentication within a cloud based computing environment in accordance with the disclosed embodiments. In particular, the flow diagram illustrating method 200 is from the perspective of the cloud services application in communication with a web browser, and the flow diagram illustrating method 300 is from the perspective of the web browser in communication with the cloud services application. Methods 200/300 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, the web-services bridge 190, and its database system 130 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 200/300 depicted at FIGS. 2 and 3, at block 205, processing logic receives at a cloud services application executing on a cloud computing platform, a request transmitted from a web browser application executing on a customer computer system (e.g., user client device 106). The request may be a request of a user to login to the cloud services application or to another cloud services application or third party application or website. In one embodiment, this request may be as simple as a user entering, via a user input device, such as a keyboard, a uniform resource locator (URL) string of a login page for the cloud services application into the browser application and the browser application transmitting the URL string to the cloud services application. For example, the user enters into the web browser the URL string "https:/login.salesforce.com", and presses enter. The URL string is transmitted to the cloud services application where it is received. (A cloud service is any service made available to users on demand via the Internet from a cloud computing provider's application servers (e.g., application server 900) as opposed to being provided from a customer's (e.g., a company's or organization's) own on-premises servers).

Alternatively, or more generally, the user request may be to access a web resource available via a cloud services application. For example, the cloud services application may provide identity provider services, and the user may be attempting to log in to an organization or environment in the cloud, a cloud community, or even a third party (e.g., cross-domain) website external to the cloud community, but taking advantage of identity provider services such as single sign on (SSO) provided by the cloud services application. As further examples, the user may be trying purchase a product or service online and are required to login to a webpage that contains the shopping cart, or updating user profile information maintained by the cloud services on behalf of a cloud services application or third party website, including billing address, email address, time zone, credit card information, profile picture, etc.

At logic block 305, the browser application, upon the user entering the URL string, queries the customer computer system (e.g., the operating system of the customer computer system) as to whether biometric identifier authentication of the user is supported. Biometric identifiers are the distinctive, measurable, unique, characteristics used to label and describe individuals. Biometric identifiers may be physiological characteristics related to the shape of a human body. Examples include, but are not limited to, fingerprint, palm veins, face recognition, DNA, palm print, hand geometry, iris recognition, voice recognition, retina and odor/scent.

At logic block 310, the browser application receives an indication from the customer computer system that biometric identifier authentication of the user is or is not supported by the customer computer system. At logic block 210, the cloud services application receives an indication from the browser application that biometric identifier authentication of the user is supported by the customer computer system if indeed the browser receives an indication of such at logic block 310 from the customer computer system. In one embodiment, this indication could be included in the login request at logic block 205, in such case, the logic blocks 305 and 310 are performed before transmitting the login request as part of logic block 205.

At logic block 215, the cloud services application transmits an indication to the browser application that biometric identifier authentication of the user is enabled for a session that is to be established, responsive to the cloud services application receiving the indication from the browser application that biometric identifier authentication of the user is supported by the customer computer system at logic block 210.

At logic block 220, the cloud services application transmits a response to the login request. This response may simply be a web page, e.g., a login or welcome page, to be displayed by the browser application in a display screen of the customer computer system, responsive to receipt of the login request at logic block 205. In one embodiment, the response prompts the user to input a biometric identifier. Additionally, the logic block may ask the user to input a username and password. Logic block 220, in one embodiment, may be combined or performed in the reverse order with the step performed by logic block 215.

At logic block 315, the browser application receives input of the biometric identifier of user, and, in one embodiment, the user's name and password. For example, the user, in one embodiment, submits a fingerprint scan via fingerprint scanner input device, or a voice clip via a speakerphone, or a picture of the user's face via a web camera.

However, at logic block 320, rather than the web browser transmitting the biometric identifier information for the user to the cloud services application over a network, the browser application instead transmits to the operating system of the customer computer system a request for a unique identifier associated with the user's biometric identifier. In one embodiment, the request is for a universally unique identifier (UUID) associated with the user's biometric identifier. In one embodiment, the user's biometric identifier information is set up previously when the user installs, initializes and enables a biometric input device, associated drivers, and software, inputs their biometric identifier as part of the enablement process. The UUID may be established at such time as well.

The operating system of the customer computer system searches local storage associated with the customer computer system at logic block 325 for a stored biometric identifier that matches the received biometric identifier of the user, in response to the request issued at logic block 320. The operating system retrieves from the local storage on the customer computer system a UID associated with the received biometric identifier when the search finds a stored biometric identifier that matches the received biometric identifier of the user. The browser, in turn, receives from the operating system the UID associated with the received biometric identifier.

At logic block 225, the cloud services application receives the UID associated with the received biometric identifier. In one embodiment, the web browser passes the UID to the cloud services application in a callback URL string. At logic block 230, the cloud services application searches a cloud computing platform co-located list of user profiles, each with an associated one or more UIDs, for a UID that matches the received UID associated with the biometric identifier. In one embodiment, the user profiles are previously configured as part of the set up of or update to user profiles maintained by the cloud services application.

At logic blocks 235 and 240, if a match for the received UID is found in the list of UIDs, the cloud services application transmits an indication (e.g., an access token) to the browser application allowing access to the web service application. In one embodiment, the cloud services application transmits a web page, e.g., a welcome page, indicating the user is authenticated and logged in. If, on the other hand, a match is not found for the received UID, at logic blocks 235 and 245, the cloud services application transmits a notification that access is denied to the requested resource.

Figure 4:
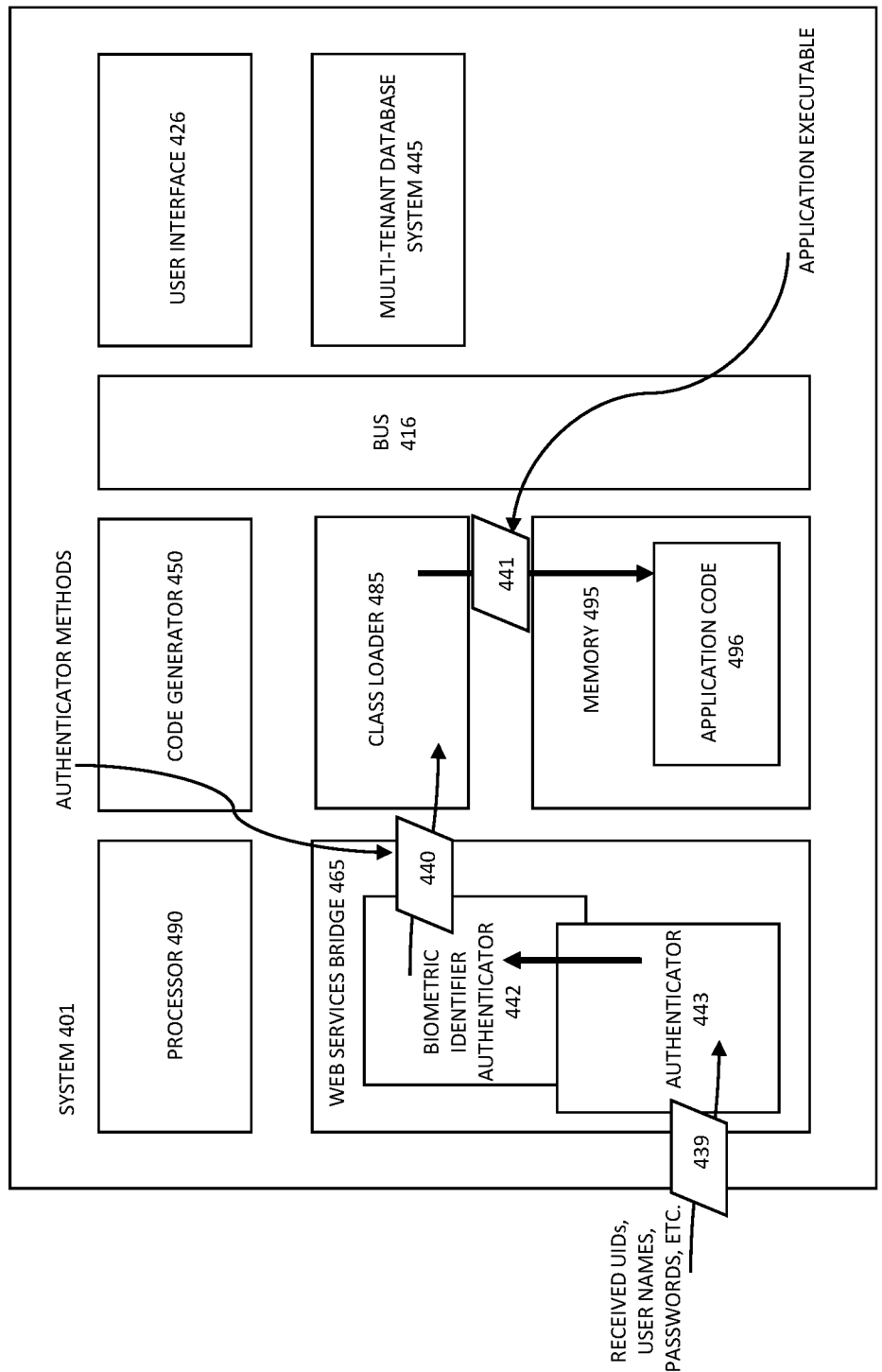
FIG. 4 shows a diagrammatic representation of a system within which embodiments may operate, be installed, integrated, or configured.

FIG. 4 shows a diagrammatic representation of a system 401 within which embodiments may operate, be installed, integrated, or configured. In accordance with one embodiment, there is a system 401 having at least a processor 490 and a memory 495 therein to execute implementing application code 496. Such a system 401 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 401, which may operate within a host organization, includes the processor 490 and the memory 495 to execute instructions at the system 401. According to such an embodiment, the system 401 further includes a means to receive from a browser application executing on a customer computer system a request of a user to login to the cloud services application, a means to receive an indication via the browser application that biometric identifier authentication of the user is supported by the customer computer system, a means to transmit an indication to the browser application that biometric identifier authentication of the user is enabled for a session that is to be established, responsive to the cloud services application receiving the indication from the browser application that biometric identifier authentication of the user is supported by the customer computer system, a means to transmit a response to the login request, responsive to receipt of the login request, the response prompting the user to input a biometric identifier, a means to receive a unique identifier (UID) associated with the biometric identifier, a means to search a cloud computing platform co-located list of user profiles, each with an associated one or more UIDs, for a UID that matches the received UID associated with the biometric identifier and a means to transmit an indication to the browser application allowing access to the web service application responsive to finding a UID that matches the received UID associated with the biometric identifier.

According to another embodiment of the system 401, a user interface 426 operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives inputs from the client device to design the application as a request for services from the cloud based service provider.

Bus 416 interfaces the various components of the system 401 amongst each other, with any other peripheral(s) of the system 401, and with external components such as external network elements, other machines, client devices, cloud computing services, etc. Communications may further include communicating with external devices via a network interface over a LAN, WAN, or the public Internet.

Figure 5A:
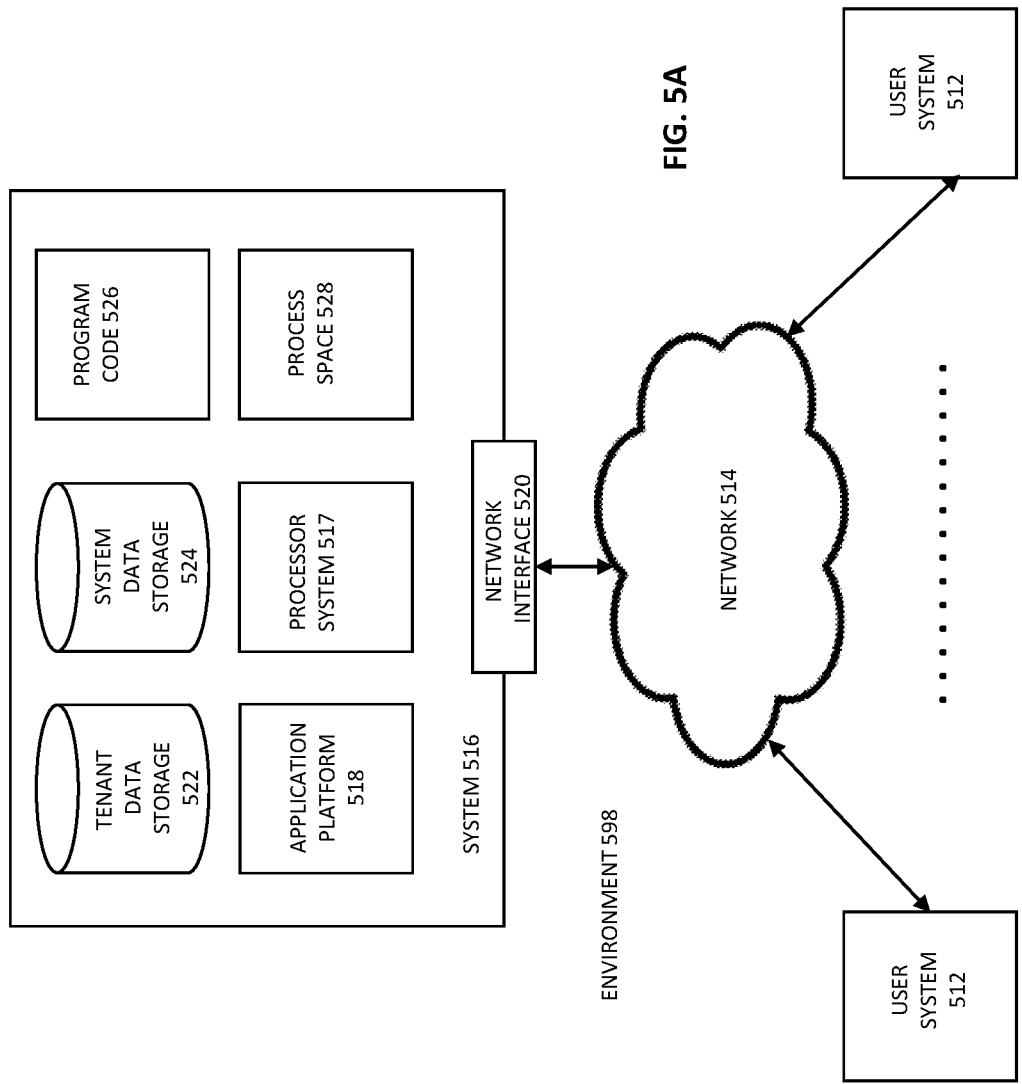
FIG. 5A illustrates a block diagram of an environment in which an on-demand database service may operate in accordance with the described embodiments.

FIG. 5A illustrates a block diagram of an environment 598 in which an on-demand database service may operate in accordance with the described embodiments. Environment 598 may include user systems 512, network 514, system 516, processor system 517, application platform 518, network interface 520, tenant data storage 522, system data storage 524, program code 526, and process space 528. In other embodiments, environment 598 may not have all of the components listed and/or may have other elements instead of, or in addition to, those listed above.

Environment 598 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5A (and in more detail in FIG. 5B) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" is used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5A, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5A, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5A include conventional, well-known elements that are explained only briefly here. For example, each user system 512 may include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5B illustrates another block diagram of an embodiment of elements of FIG. 5A and various possible interconnections between such elements in accordance with the described embodiments. FIG. 5B also illustrates environment 599. However, in FIG. 5B, the elements of system 516 and various interconnections in an embodiment are illustrated in further detail. More particularly, FIG. 5B shows that user system 512 may include a processor system 512A, memory system 512B, input system 512C, and output system 512D. FIG. 5B shows network 514 and system 516. FIG. 5B also shows that system 516 may include tenant data storage 522, having therein tenant data 523, which includes, for example, tenant storage space 527, tenant data 529, and application metadata 531. System data storage 524 is depicted as having therein system data 525. Further depicted within the expanded detail of application servers 500$_{1-N}$ are User Interface (UI) 530, Application Program Interface (API) 532, application platform 518 includes PL/SOQL 534, save routines 536, application setup mechanism 538, process space 528 includes system process space 502, tenant 1-N process spaces 504, and tenant management process space 510. In other embodiments, environment 599 may not have the same elements as those listed above and/or may have other elements instead of, or in addition to, those listed above.

User system 512, network 514, system 516, tenant data storage 522, and system data storage 524 were discussed above in FIG. 5A. As shown by FIG. 5B, system 516 may include a network interface 520 (of FIG. 5A) implemented as a set of HTTP application servers 500, an application platform 518, tenant data storage 522, and system data storage 524. Also shown is system process space 502, including individual tenant process spaces 504 and a tenant management process space 510. Each application server 500 may be configured to tenant data storage 522 and the tenant data 523 therein, and system data storage 524 and the system data 525 therein to serve requests of user systems 512. The tenant data 523 might be divided into individual tenant storage areas (e.g., tenant storage space 527), which can be either a physical arrangement and/or a logical arrangement of data. Within each tenant storage space 527, tenant data 529, and application metadata 531 might be similarly allocated for each user. For example, a copy of a user's most recently used (MRU) items might be stored to tenant data 529. Similarly, a copy of MRU items for an entire organization that is a tenant might be stored to tenant storage space 527. A UI 530 provides a user interface and an API 532 provides an application programmer interface into system 516 resident processes to users and/or developers at user systems 512. The tenant data and the system data may be stored in various databases, such as one or more Oracle™ databases.

Application platform 518 includes an application setup mechanism 538 that supports application developers' creation and management of applications, which may be saved as metadata into tenant data storage 522 by save routines 536 for execution by subscribers as one or more tenant process spaces 504 managed by tenant management process space 510 for example. Invocations to such applications may be coded using PL/SOQL 534 that provides a programming language style interface extension to API 532. Invocations to applications may be detected by one or more system processes, which manages retrieving application metadata 531 for the subscriber making the invocation and executing the metadata as an application in a virtual machine.

Each application server 500 may be communicably coupled to database systems, e.g., having access to system data 525 and tenant data 523, via a different network connection. For example, one application server 500$_1$ might be coupled via the network 514 (e.g., the Internet), another application server 500$_{N-1}$ might be coupled via a direct network link, and another application server 500$_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5

Big-IP load balancer) is communicably coupled between the application servers 500 and the user systems 512 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user may hit three different application servers 500, and three requests from different users may hit the same application server 500. In this manner, system 516 is multi-tenant, in which system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 500 to request and update system-level and tenant-level data from system 516 that may require sending one or more queries to tenant data storage 522 and/or system data storage 524. System 516 (e.g., an application server 500 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and a persistent database and/or a multi-tenant database implementation), which communicate with each other via a bus 630. Main memory 604 includes a web services bridge 624, a biometric identifier authenticator 625, and an authenticator 623, by which to communicate with another web services platform, retrieve, and parse a schema to identify authentication methods provided by the web service at the other web services platform in accordance with described embodiments. Main memory 604 and its sub-elements are operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display, etc.), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable storage medium or a non-transitory computer readable storage medium or a non-transitory machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, the method comprising a cloud services application executing on a cloud computing platform:
   receiving a user request to access a resource available via the cloud services application by receiving the user request from a browser application executing on a customer computer system;
   transmitting a response to the resource access request, responsive to receipt of the resource access request, the response prompting the user to input a biometric identifier;
   wherein the customer computer system is to: ( ) receive input at the browser application corresponding to a biometric identifier of a user, (ii) transmit the input to an operating system of the customer computer system, (iii) search, via the operating system, local storage for the biometric identifier that matches the input received; and (iv) retrieve a unique identifier (UID) associated with the biometric identifier that matches the input received corresponding to the biometric identifier of the user;
   wherein the method further comprises:
   receiving the UID associated with the biometric identifier at the cloud computing platform;
   searching a list of user profiles at the cloud computing platform, each list being an associated one or more UIDs, for a UID that matches the received UID associated with the biometric identifier of the user; and
   transmitting an indication to the browser application allowing access to the web service application responsive to finding the UID that matches the received UID associated with the biometric identifier of the user.

2. The method of claim 1, further comprising the cloud services application:
   receiving an indication via the browser application that biometric identifier authentication of the user is supported by the customer computer system;
   transmitting an indication to the browser application that biometric identifier authentication of the user is enabled for a session that is to be established, responsive to the cloud services application receiving the indication from the browser application that biometric identifier authentication of the user is supported by the customer computer system.

3. The method of claim 1 further comprising the cloud services application:
   establishing a session for the user between the cloud services application and the web browser responsive to finding a UID that matches the received UID associated with the biometric identifier; and
   transmitting to the web browser for display a page indicating the user is authenticated and the resource is accessible.

4. The method of claim 1, further comprising querying by the browser application the customer computer system whether biometric identifier authentication of the user is supported responsive to the request of the user to access the resource via the cloud services application.

5. The method of claim 4, further comprising receiving at the browser application an indication from the customer computer system that biometric identifier authentication of the user is supported by the customer computer system, responsive to querying the customer computer system whether biometric identifier authentication of the user is supported.

6. The method of claim 1, further comprising:
   receiving input at the browser application of the biometric identifier of user; and
   transmitting from the browser application to the operating system of the customer computer system a request for the UID associated with biometric identifier.

7. The method of claim 1:
wherein the cloud computing platform implements on-demand cloud computing services provided to subscribers of the cloud computing platform; and
wherein the user is associated with one of a plurality of customer organizations having subscriber access to the on-demand cloud computing services provided by the cloud computing platform.

8. The method of claim 1:
wherein the system comprises a multi-tenant database system having customer data stored therein for a plurality of distinct customer organizations;
wherein the customer computer system comprises a user device associated with one of the plurality of customer organizations operating remote from the system and which communicably interfaces with the system via a public Internet;
wherein the system implements the cloud computing platform to provide a cloud based service provider to the user device associated with the customer organization; and
wherein each customer organization is an entity selected from the group consisting of: a separate and distinct remote organization, an organizational group within the host organization, a business partner of the host organization, or a customer organization that subscribes to cloud computing services provided by the host organization.

9. A system to execute within a host organization, wherein the system comprises:
a processor and a memory to execute instructions at the system;
software instructions that, when executed by the processor, cause a cloud services application executing on a cloud computing platform to:
receive a user request to access a resource available via the cloud services application by receiving the user request from a browser application executing on a customer computer system;
transmit a response to the resource access request, responsive to receipt of the resource access request, the response prompting the user to input a biometric identifier;
wherein the customer computer system is to: (i) receive input at the browser application corresponding to a biometric identifier of a user, (ii) transmit the input to an operating system of the customer computer system, (iii) search, via the operating system, local storage for the biometric identifier that matches the input received; and (iv) retrieve a unique identifier (UID) associated with the biometric identifier that matches the input received corresponding to the biometric identifier of the user;
wherein the software instruction cause the cloud services application to further:
receive the UID associated with the biometric identifier at the cloud computing platform;
search
transmit an indication to the browser application allowing access to the web service application responsive to finding the UID that matches the received UID associated with the biometric identifier of the user.

10. The system of claim 9, further comprising software instructions, that when executed by the processor, cause the cloud services application to:
receive an indication via the browser application that biometric identifier authentication of the user is supported by the customer computer system;
transmit an indication to the browser application that biometric identifier authentication of the user is enabled for a session that is to be established, responsive to the cloud services application receiving the indication from the browser application that biometric identifier authentication of the user is supported by the customer computer system.

11. The system of claim 9 further comprising software instructions, that when executed by the processor, cause the cloud services application to:
establish a session for the user between the cloud services application and the web browser responsive to finding a UID that matches the received UID associated with the biometric identifier; and
transmit to the web browser for display a page indicating the user is authenticated and the resource is accessible.

12. The system of claim 9, further comprising software instructions, that when executed by the processor, cause the browser application to query the customer computer system whether biometric identifier authentication of the user is supported responsive to the request of the user to access the resource available via the cloud services application.

13. The system of claim 12, further comprising software instructions, that when executed by the processor cause the browser application to receive at the browser application an indication from the customer computer system that biometric identifier authentication of the user is supported by the customer computer system, responsive to querying the customer computer system whether biometric identifier authentication of the user is supported.

14. The system of claim 9, further comprising software instructions that, when executed by the processor, cause the browser application to:
receive input of the biometric identifier of user; and
transmit to the operating system of the customer computer system a request for the UID associated with biometric identifier.

15. The system of claim 9:
wherein the cloud computing platform implements on-demand cloud computing services provided to subscribers of the cloud computing platform; and
wherein the user is associated with one of a plurality of customer organizations having subscriber access to the on-demand cloud computing services provided by the cloud computing platform.

16. The system of claim 9:
wherein the system comprises a multi-tenant database system having customer data stored therein for a plurality of distinct customer organizations;
wherein the customer computer system comprises a user device associated with one of the plurality of customer organizations operating remote from the system and which communicably interfaces with the system via a public Internet;
wherein the system implements the cloud computing platform to provide a cloud based service provider to the user device associated with the customer organization; and
wherein each customer organization is an entity selected from the group consisting of: a separate and distinct remote organization, an organizational group within the host organization, a business partner of the host organization, or a customer organization that subscribes to cloud computing services provided by the host organization.

17. Non-transitory computer readable storage media having instructions stored thereon that, when executed by a processor of a system, the instructions cause a cloud services application executing on a cloud computing platform to perform operations including:
receiving a user request to access a resource available via the cloud services application by receiving the user request from a browser application executing on a customer computer system;
transmitting a response to the resource access request, responsive to receipt of the resource access request, the response prompting the user to input a biometric identifier;
wherein the customer computer system is to: (i) receive input at the browser application corresponding to a biometric identifier of a user, (ii) transmit the input to an operating system of the customer computer system, (iii) search, via the operating system, local storage for the biometric identifier that matches the input received; and (iv) retrieve a unique identifier (UID) associated with the biometric identifier that matches the input received corresponding to the biometric identifier of the user;
wherein the method further comprises:
receiving the UID associated with the biometric identifier at the cloud computing platform;
searching a list of user profiles at the cloud computing platform, each list being an associated one or more UIDs, for a UID that matches the received UID associated with the biometric identifier of the user; and
transmitting an indication to the browser application allowing access to the web service application responsive to finding the UID that matches the received UID associated with the biometric identifier of the user.

18. The non-transitory computer readable storage media of claim 17, further having instructions stored thereon that, when executed by a processor of a system, cause the cloud services application to:
establish a session for the user between the cloud services application and the web browser responsive to finding a UID that matches the received UID associated with the biometric identifier; and
transmit to the web browser for display a welcome page indicating the user is authenticated and logged in.

19. The non-transitory computer readable storage media of claim 17, further having instructions stored thereon that, when executed by a processor of a system, cause the browser application to query the customer computer system whether biometric identifier authentication of the user is supported responsive to the request of the user to login to the cloud services application.

20. The non-transitory computer readable storage media of claim 19, further having instructions stored thereon that, when executed by a processor of a system, cause the browser application to receive an indication from the customer computer system that biometric identifier authentication of the user is supported by the customer computer system, responsive to querying the customer computer system whether biometric identifier authentication of the user is supported.

21. The non-transitory computer readable storage media of claim 17, further having instructions stored thereon that, when executed by a processor of a system, cause the browser application to:
receive input of the biometric identifier of user; and
transmit to the operating system of the customer computer system a request for the UID associated with biometric identifier.

22. The non-transitory computer readable storage media of claim 21, wherein the instruction, when executed by the processor, cause the cloud services application to perform operations further comprising:
establishing a session for the user between the cloud services application and the web browser responsive to finding a UID that matches the received UID associated with the biometric identifier; and
transmitting to the web browser for display a page indicating the user is authenticated and the resource is accessible.

23. The non-transitory computer readable storage media of claim 21, wherein the instruction, when executed by the processor, cause the cloud services application to perform operations further comprising:
receiving an indication via the browser application that biometric identifier authentication of the user is supported by the customer computer system;
transmitting an indication to the browser application that biometric identifier authentication of the user is enabled for a session that is to be established, responsive to the cloud services application receiving the indication from the browser application that biometric identifier authentication of the user is supported by the customer computer system.

* * * * *